US009022120B2

(12) United States Patent (10) Patent No.: US 9,022,120 B2
Zamora et al. (45) Date of Patent: May 5, 2015

(54) DRY POLYMER MIXING PROCESS FOR FORMING GELLED FLUIDS

(75) Inventors: Frank Zamora, George West, TX (US); Sarkis R. Kakadjian, San Antonio, TX (US); Ronald J. Powell, Humble, TX (US)

(73) Assignee: Lubrizol Oilfield Solutions, LLC, The Woodlands, TX (US)

( * ) Notice: Subject to any disclaimer, the term of this patent is extended or adjusted under 35 U.S.C. 154(b) by 187 days.

(21) Appl. No.: 13/094,806

(22) Filed: Apr. 26, 2011

(65) Prior Publication Data

US 2012/0273206 A1 Nov. 1, 2012

(51) Int. Cl.
 *E21B 43/26* (2006.01)
 *E21B 43/16* (2006.01)
 *B01F 5/00* (2006.01)
 *C09K 8/68* (2006.01)

(52) U.S. Cl.
 CPC .............. *C09K 8/68* (2013.01); *C09K 2208/28* (2013.01)

(58) Field of Classification Search
 None
 See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,974,077 A * | 8/1976 | Free | 507/211 |
| 3,990,978 A | 11/1976 | Hill | 507/235 |
| 4,007,792 A | 2/1977 | Meister | 166/308.2 |
| 4,052,159 A | 10/1977 | Fuerst et al. | 8/6 |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,336,145 A | 6/1982 | Briscoe | |
| 4,378,845 A | 4/1983 | Medlin et al. | 166/297 |
| 4,395,340 A * | 7/1983 | McLaughlin | 507/226 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |

(Continued)

*Primary Examiner* — Angela M DiTrani
*Assistant Examiner* — Anuradha Ahuja
(74) *Attorney, Agent, or Firm* — Robert W. Strozier

(57) ABSTRACT

Apparatus, methods and systems for preparing a polymer concentrate for treating a formation with slick water systems viscous fluid or a gelled viscous fluid are disclosed. The method includes directing a powdered gel into a vortex mixing chamber, while directing a first portion of a base fluid into the vortex mixing chamber to form partially hydrated fluid concentrate. The partially hydrated fluid concentrate is then sucked or sweep into a main portion of base fluid for form the slick water systems viscous fluid or gelled viscous fluid.

20 Claims, 12 Drawing Sheets

(56) References Cited

U.S. PATENT DOCUMENTS

| | | | |
|---|---|---|---|
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,772,646 A | 9/1988 | Harms et al. | |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,828,034 A | 5/1989 | Constien et al. | |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,190,374 A * | 3/1993 | Harms et al. | 366/165.2 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,344,619 A * | 9/1994 | Larwick et al. | 422/261 |
| 5,347,004 A | 9/1994 | Rivers et al. | 544/180 |
| 5,363,919 A | 11/1994 | Jennings, Jr. | 166/308.1 |
| 5,382,411 A * | 1/1995 | Allen | 422/131 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,104,328 B2 * | 9/2006 | Phillippi et al. | 166/308.5 |
| 7,140,433 B2 | 11/2006 | Gatlin et al. | 166/250.1 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | 166/372 |
| 7,566,686 B2 | 7/2009 | Kippie et al. | 507/213 |
| 7,712,535 B2 | 5/2010 | Venditto et al. | 166/308.2 |
| 7,767,628 B2 | 8/2010 | Kippie et al. | 507/102 |
| 7,794,135 B2 * | 9/2010 | El Kholy et al. | 366/163.2 |
| 7,829,510 B2 | 11/2010 | Gatlin et al. | 507/277 |
| 7,886,824 B2 | 2/2011 | Kakadjian et al. | 166/308.2 |
| 7,915,203 B2 | 3/2011 | Falana et al. | 507/136 |
| 7,932,214 B2 | 4/2011 | Zamora et al. | 507/202 |
| 7,942,201 B2 | 5/2011 | Ekstrand et al. | 133/246 |
| 7,956,017 B2 | 6/2011 | Gatlin et al. | 166/280.2 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegem | 166/270 |
| 8,012,913 B2 | 9/2011 | Gatlin et al. | 507/239 |
| 8,028,755 B2 | 10/2011 | Darnell et al. | 166/379 |
| 8,034,750 B2 | 10/2011 | Thompson et al. | 507/273 |
| 8,065,905 B2 | 11/2011 | Sweeney et al. | 73/49.1 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |
| 8,099,997 B2 | 1/2012 | Curr et al. | 73/49.5 |
| 8,141,661 B2 | 3/2012 | Kakadjian et al. | 175/69 |
| 8,158,562 B2 | 4/2012 | Wilson, Jr. et al. | 507/203 |
| 8,172,952 B2 | 5/2012 | Wanner et al. | 134/22.11 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2004/0028582 A1* | 2/2004 | Carpenter et al. | 422/245.1 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2006/0028914 A1* | 2/2006 | Phillippi et al. | 366/279 |
| 2006/0194700 A1 | 8/2006 | Gatlin et al. | 507/203 |
| 2008/0251252 A1 | 10/2008 | Schwartz | 507/238 |

(56) References Cited

U.S. PATENT DOCUMENTS

| | | | |
|---|---|---|---|
| 2008/0318812 A1 | 12/2008 | Kakadjian et al. | 507/219 |
| 2009/0023614 A1* | 1/2009 | Sullivan et al. | 507/214 |
| 2009/0163387 A1* | 6/2009 | Sullivan et al. | 507/202 |
| 2009/0250659 A1 | 10/2009 | Gatlin | 208/236 |
| 2009/0275488 A1 | 11/2009 | Zamora et al. | 507/236 |
| 2009/0281004 A1* | 11/2009 | Ali et al. | 507/219 |
| 2010/0077938 A1 | 4/2010 | Zamora et al. | 106/677 |
| 2010/0212905 A1 | 8/2010 | van Petegem | 507/236 |
| 2010/0252262 A1 | 10/2010 | Ekstrand et al. | 166/305.1 |
| 2010/0292108 A1 | 11/2010 | Kakadjian | 507/229 |
| 2010/0305010 A1 | 12/2010 | Falana et al. | 507/274 |
| 2010/0311620 A1 | 12/2010 | Kakadjian et al. | 507/266 |
| 2011/0001083 A1 | 1/2011 | Falana et al. | 252/178 |
| 2011/0005756 A1 | 1/2011 | van Petegen | 507/236 |
| 2011/0240131 A1 | 10/2011 | Parker | 137/13 |
| 2011/0247821 A1 | 10/2011 | Thompson et al. | 507/267 |
| 2011/0284247 A1 | 11/2011 | Zamora et al. | 166/295 |
| 2011/0284248 A1 | 11/2011 | Zamora et al. | 166/295 |
| 2012/0071366 A1 | 3/2012 | Falana et al. | 507/202 |
| 2012/0071367 A1 | 3/2012 | Falana et al. | 507/203 |
| 2012/0071370 A1 | 3/2012 | Falana et al. | 507/233 |
| 2012/0073813 A1 | 3/2012 | Zamora et al. | 166/285 |
| 2012/0137752 A1 | 6/2012 | Morrow | 73/49.5 |

* cited by examiner

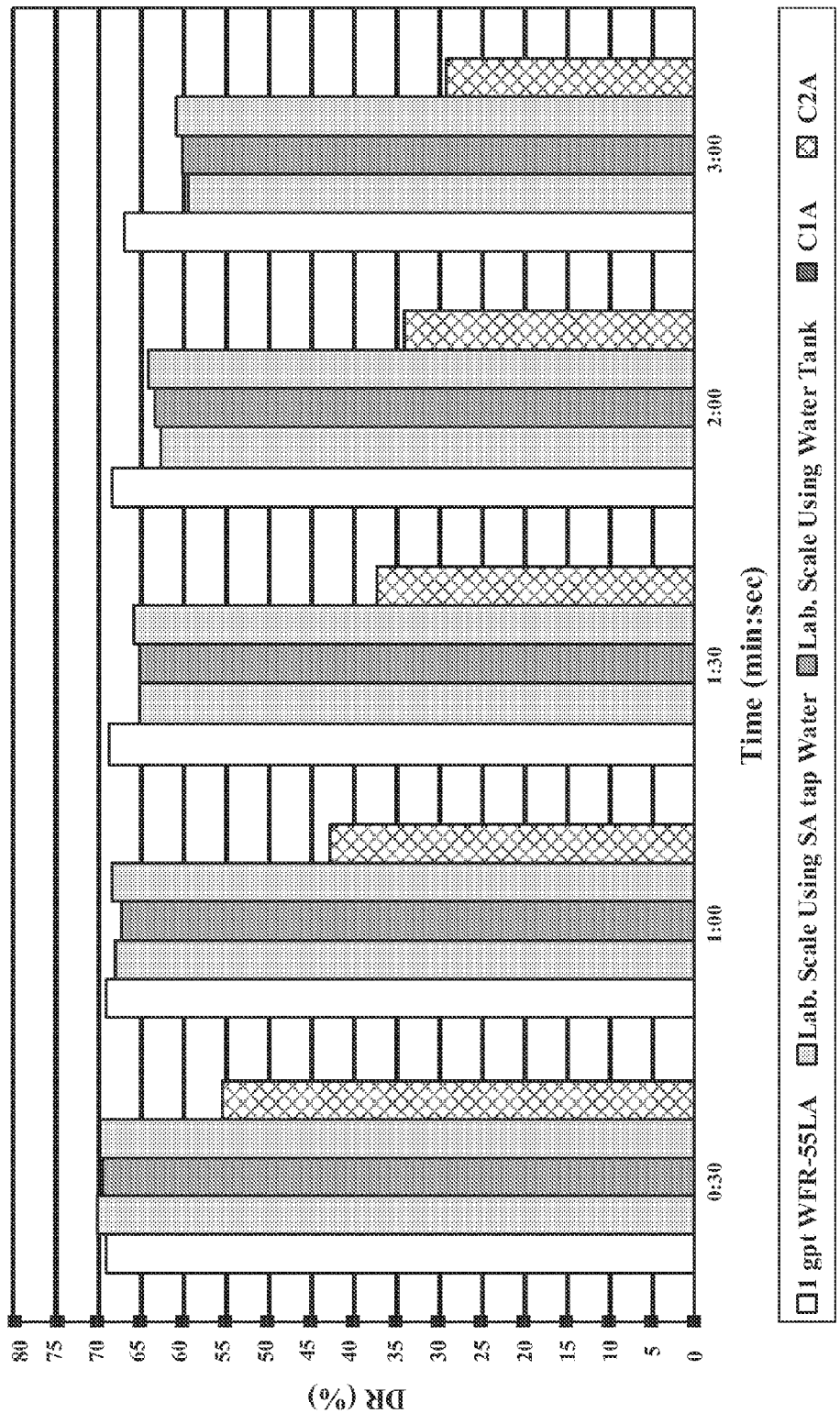

DRY POLYMER MIXING PROCESS FOR FORMING GELLED FLUIDS

BACKGROUND OF THE INVENTION

1. Field of the Invention

Embodiments of the present invention relate to apparatus, systems and methods for mixing of dry compositions including hydratable agents and optionally gelling agents with base fluids to form hydrated viscous fluids or hydrated gelled viscous fluids, where the hydrated fluids have application in fracturing and similar applications.

more particularly, embodiments of the present invention relate to apparatus, systems and methods for mixing of dry compositions including hydratable agents and optionally gelling agents with base fluids to form hydrated viscous fluids or hydrated gelled viscous fluids, where the hydrated fluids have application in fracturing and similar applications, where the hydrated fluids are formed using a vortex mixing apparatus capable of efficient and effective on-site and on-demand mixing and hydrating the dry compositions into the base fluid without unwanted clumping.

2. Description of the Related Art

Many treatments and procedures are carried out in the oil industry utilizing high viscosity fluids to accomplish a number of purposes. For example, in the oil industry, high viscosity aqueous well treating fluids or gels are utilized in treatments to increase the recovery of hydrocarbons from subterranean formations, such as by creating fractures in the formation. High viscosity aqueous fluids are also commonly utilized in well completion procedures. For example, during the completion of a well, a high viscosity aqueous completion fluid having a high density is introduced into the well to maintain hydrostatic pressure on the formation which is higher than the pressure exerted by the fluids contained in the formation, thereby preventing the formation fluids from flowing into the wellbore. High viscosity treating fluids, such as fracturing gels, are normally made using dry gel additives or agents which are mixed with water or other aqueous fluids at the job site. Such mixing procedures have some inherent problems, particularly on remote sites or when large volumes are required. For example, special equipment for mixing the dry additives with water is required, and problems such as chemical dusting, uneven mixing, and lumping result. The lumping of gels occurs because the initial contact of the gel with water results in a very rapid hydration of the outer layer of particles which creates a sticky, rubbery exterior layer that prevents the interior particles from contacting water. The net effect is formation of what are referred to as "gel balls" or "fish eyes". These hamper efficiency by lowering the viscosity achieved per pound of gelling agent and also by creating insoluble particles that can restrict flow both into the well formation and back out of it. Thus, simply mixing the untreated gel directly with water is not a very successful method of preparing a smooth homogeneous gel free from lumps.

A method directed to solving this problem is to control particle size and provide surface treatment modifications to the gel. It is desired to delay hydration long enough for the individual gel particles to disperse and become surrounded by water so that no dry particles are trapped inside a gelled coating. This can be achieved by coating the gel with materials such as borate salts, glyoxal, non-lumping HEC, sulfosuccinate, metallic soaps, surfactants, or other materials of opposite surface charge to the gel. A stabilized gel slurry (SPS), also referred to as a liquid gel concentrate (LGC), is the most common way to improve the efficiency of a gel addition to water and derive the maximum yield from the gel. The liquid gel concentrate is premixed and then later added to the water. U.S. Pat. No. 4,336,145 disclosed a liquid gel concentrate comprising water, the gel, and an inhibitor having the property of reversibly reacting with the hydratable gel in a manner wherein the rate of hydration of the gel is retarded.

U.S. Pat. No. 4,722,646 disclosed a hydrocarbon carrier fluid, rather than water, so higher quantities of solids can be suspended. The hydrocarbon-based liquid gel concentrate is later mixed with water in a manner similar to that for aqueous-based liquid gel concentrates to yield a viscosified fluid, but hydrocarbon-based concentrates have the advantage of holding more gel.

U.S. Pat. No. 4,828,034 disclosed one method and system for on-demand mixing of a fracturing gel, in which a fracturing fluid slurry concentrate is mixed through a static mixer device on a real-time basis to produce a fully hydrated fracturing fluid during the fracturing operation. This process utilizes a hydrophobic solvent, which is characterized by a hydrocarbon such as diesel as in the hydrocarbon-based liquid gel concentrates described above.

U.S. Pat. No. 5,190,374 disclosed method and apparatus for substantially continuously producing a fracturing gel, without the use of hydrocarbons or suspension agents, by feeding the dry polymer into an axial flow mixer which uses a high mixing energy to wet the polymer during its initial contact with water.

U.S. Pat. No. 5,382,411 disclosed apparatus and method for continuously hydrating a particulated polymer and producing a well treatment gel.

Inverted emulsions of water soluble polymers are currently used in subterranean treatments such as hydraulic fracturing operations. Similarly polymer gelling agents are prepared using oil based slurries. The concentrates contain hydrocarbons and surfactants. Elimination of the hydrocarbon and the surfactants is desired for cost (material and shipping) and for environmental reasons. The mixers currently used are very costly and are often part of complicated systems.

Dry polymer mixing units have been patented and introduced into field operations. U.S. Pat. Nos. 5,190,374 and 7,104,328 disclose two different mixers. SNF Floerger offers a Polymer Slicing Unit (PSU) described in detail at the website (http://www.snf-oil.com/Equipment.html). The mixer described in U.S. Pat. No. 5,190,374 is reported to fail due to polymer build-up inside the mixer. The mixer described in U.S. Pat. No. 7,104,328 and the PSU both provide shear by a rotating impeller. The mixer described in U.S. Pat. No. 7,104,328 is used to provide a substantially hydrated polymer solution for a continuous mix on demand fracturing operation. The PSU is described to deliver up to a 1.5% polymer solution. Both mixers are used in conjunction with holding tanks to allow additional time for more complete polymer hydration.

While numerous methods and systems have been put in practice for downhole fracturing of oil and gas wells, there is still in need in the art for a less expensive and simpler methods and systems for on-demand hydrating dry hydratable powders on site.

SUMMARY OF THE INVENTION

Embodiments of the present invention provide apparatus for preparing slick water, viscous or gelled viscous fracturing fluids, where the apparatus includes a housing defining a vortex mixing chamber. A dry composition is fed into the vortex mixing chamber, while and a first portion of the base fluid is fed radially into the vortex mixing chamber to form a partially hydrated, substantially clump and/or fish-eye free fluid. A second portion of the base fluid is directed through a nozzle to form a vacuum zone, which sucks or sweeps the partially hydrated fluids exiting the vortex mixing chamber into the second portion of the base fluid to form a hydrated or substantially hydrated and clump-free concentrate. As the partially hydrated fluid is swept into the second portion of the base fluid, the partially hydrated fluid become substantially hydrated to form the completely or substantially completely hydrated, substantially clump and/or fish-eye free concentrate or concentrated fluid. The substantially hydrated, substantially clump and/or fish-eye free concentrate or concentrated fluid may then be injected directly or after dilution into a formation under sufficient injection velocity and pressure to fracture the subterranean well. The apparatus may also be equipped with a recirculation loop to send the concentrate back through the vortex mixing chamber. The apparatus may also include a holding tank or plurality of holding tanks, a static mixing or a plurality of static mixers, and/or an auxiliary mechanical mixer or a plurality of mechanical mixers.

Embodiments of the present invention provide methods for preparing slick water, viscous or gelled viscous fracturing fluids, where the method includes supplying a dry composition to a vortex mixing chamber of a vortex mixing apparatus, while directly a first portion of a base fluid radially into the vortex mixing chamber to form a partially hydrated, substantially clump-free and/or fish-eye free fluid. A second portion of the base fluid is directed through a nozzle to form a vacuum zone, which sucks or sweeps the partially hydrated fluid exiting the vortex mixing chamber into the second portion of the base fluid to form a hydrated or substantially hydrated concentrate. As the partially hydrated fluid is swept into the second portion of the base fluid, the partially hydrated fluid becomes substantially hydrated to form completely or substantially completely hydrated, substantially clump-free and/or fish-eye free concentrate. The substantially hydrated, substantially clump-free and/or fish-eye free concentrate or concentrated fluid may then be injected directly or after dilution into a formation under sufficient injection velocity and pressure to fracture the subterranean well. The apparatus may also be equipped with a recirculation loop to send the concentrate back through the vortex mixing chamber. The apparatus may also include a holding tank or plurality of holding tanks, a static mixing or a plurality of static mixers, and/or an auxiliary mechanical mixer or a plurality of mechanical mixers.

Embodiments of the present invention provide systems for preparing viscous or gelled viscous fracturing fluids, where the system includes a housing defining a vortex mixing chamber. A dry composition and a first portion of the base fluid are fed into the vortex mixing chamber to form partially hydrated, substantially clump-free and/or fish-eye free fluids. A second portion of the base fluid is directly through a nozzle to form a vacuum zone, which sucks or sweeps the partially hydrated fluid into the second portion of the base fluid to form a hydrated concentrate. As the partially hydrated fluid is swept into the second portion of the base fluid, the partially hydrated fluid become substantially hydrated to form completely or substantially completely hydrated, substantially clump-free and/or fish-eye free concentrate. The substantially hydrated, substantially clump-free and/or fish-eye free concentrate or concentrated fluid may then be injected directly or after dilution into a formation under sufficient injection velocity and pressure to fracture the subterranean well. The system may also be equipped with a recirculation loop to send the concentrate back through the vortex mixing chamber. The system may also include a holding tank or plurality of holding tanks, a static mixing or a plurality of static mixers, and/or an auxiliary mechanical mixer or a plurality of mechanical mixers.

BRIEF DESCRIPTION OF THE DRAWINGS

The invention can be better understood with reference to the following detailed description together with the appended illustrative drawings in which like elements are numbered the same:

FIG. 8 depicts a bar graph of percent friction reduction in fresh water of several dry compositions compared to 1 gpt WFR-55LA.

DEFINITIONS OF THE INVENTION

Figure 1A:
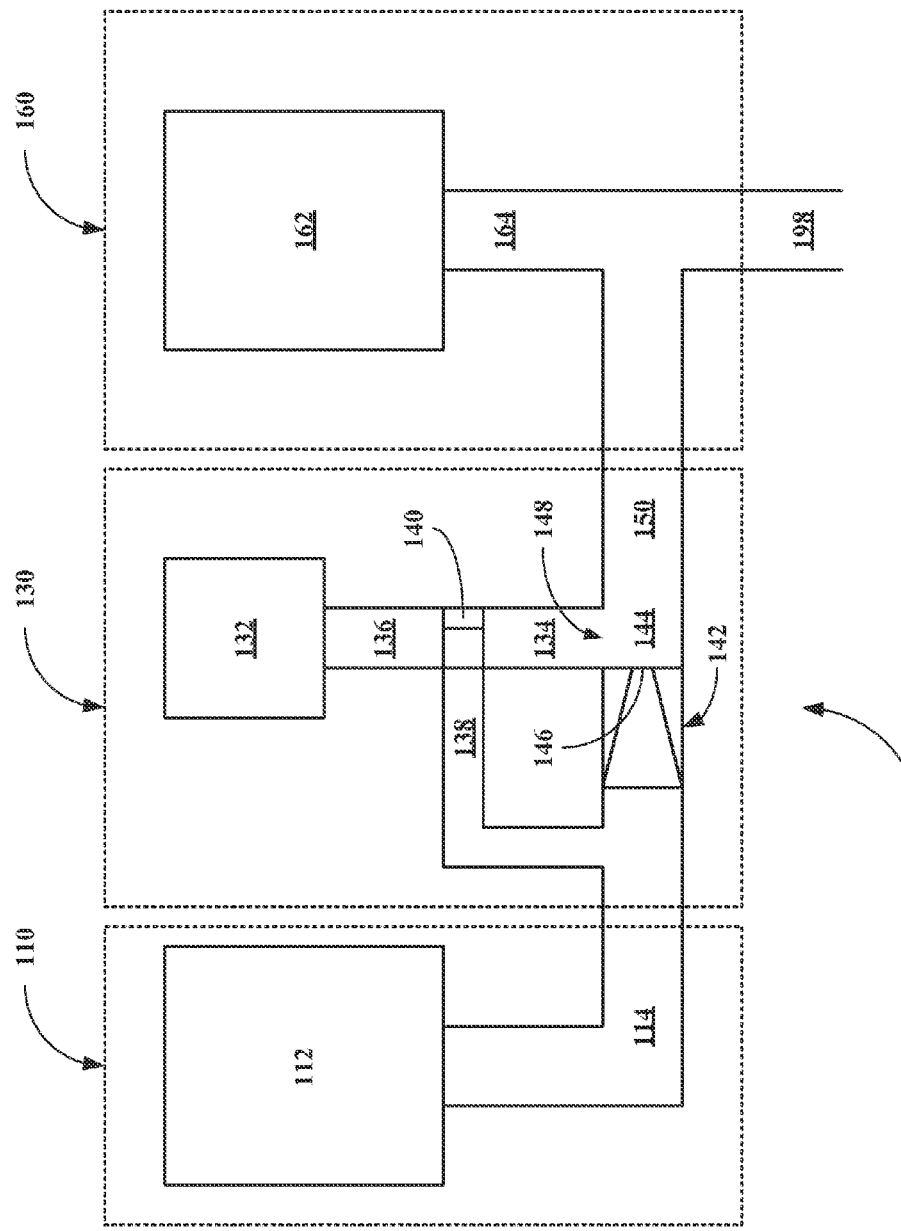
FIG. 1A depicts a schematic diagram of an embodiment of a mixing apparatus of this invention.

The term "gpt" means gallons per thousand gallons.
The term "gptg" means gallons per thousand gallons.
The term "pptg" means pounds per thousand gallons.
The term "wt. %" means weight percent.
The term "vol. %" means volume per weight.
The term "w/w" means weight per weight.
The term "w/v" means weight per volume.
The term "v/v" means volume per volume.
The term "SG" means specific gravity. It must be noted that for fluids for which the SG is one or near one, wt. %, vol. %, w/w, w/v, and v/v all mean essentially the same thing and for an SG of 1, they are totally interchangeable.

DETAILED DESCRIPTION OF THE INVENTION

The inventors have found that low cost, effective and efficient apparatus, methods and systems can be implemented for preparing hydrated fracturing fluids, where the hydrated fracturing fluids are prepared by vortex mixing a dry composition including gelling agents and hydratable agents into a base fluid by mixing a first portion of a base fluid and the dry composition in a vortex mixing chamber to form a partially hydrate and substantially clump free fluid prior to the partially hydrated fluid being sucked or swept into a second portion of the base fluid. The vortex mixing is for a time sufficient to pre-wet and partially hydrate the hydratable agents prior sweeping the partially fluid into the second portion of the base fluid, where the second portion is larger than the first portion.

The inventors have found that, in certain embodiments, a vortex mixer such as Lobestar Shear/Mixer available from Vortex Ventures may be used to mix dry compositions including gelling agents and hydratable agents into a portion of a base fluid in a vortex mixing chamber to form a pre-wetted and partially hydrated fluid, where the vortex mixing is for a time sufficient to wet and partially hydrate the hydratable agents in the dry composition. The vortex mixers mix the dry compositions with the base fluid to form high viscosity fluids for subterranean fracturing treatments. Vortex mixers are efficient, low cost mixers and form part of the systems and methods of this invention, which are used to form high viscous fluids for subterranean fracturing treatments. The systems and methods of this invention utilize the high energy imparted by vortex mixers to mix dry compositions including gelling agents and hydratable agents into a first portion of a base fluid in a vortex mixing chamber prior to the mixture being swept into a second portion of the base fluid as the stream moves past an opening through which the mixture is introduced into the second portion of the fluid, where the second portion is larger than the first portion. Unlike the systems and methods of U.S. Pat. No. 7,104,328, the present invention utilizes a substantially lower cost mixing unit that does not utilized any moving parts to affect mixing of the dry compositions including gelling agents and hydratable polymeric agents with the base fluid. The dry compositions are first mixed with a portion of a base fluid in a vortex mixing chamber to form a concentrated, pre-wetted and partially hydrated fluid, prior to the concentrated, pre-wetted and partially hydrated fluid being swept into the remainder and major portion of the base fluid. The methods of this invention are designed to form a fracturing fluid during a time period between fracturing stages, which is typically 3 to 4 hours in horizontal-well fracturing operations. The polymer concentrate is then diluted on-the-fly to the desired concentration during the fracturing operation. This mixing system is applied in a new manner to reduce cost and eliminate unwanted chemicals in subterranean treatments.

Embodiments of the present invention address problems associated with the high capital costs of mixing/blending equipment of the prior art. Embodiments of the present invention eliminate unwanted chemicals using simple low-cost, but effective vortex mixers. These methods make use of the traditional down time in a horizontal-well fracturing operations to permit on-site and on-demand fracturing fluids for use in multi-stage fracturing operations.

Embodiments of the present invention relate to polymer concentrates including from about 0.05% w/v to about 5% w/v of a dry composition of this invention in a base fluid, where the base fluid is water, an aqueous solution containing additives that do not interfere with the hydration and dispersion of the dry composition into the base fluid, a brine or other aqueous fluid useable in downhole applications. In other embodiments, the concentrates including from about 0.1% w/v to about 3.0% w/v of a dry composition of this invention in a base fluid. In other embodiments, the concentrates including from about 1.0% w/v to about 3.0% w/v of a dry composition of this invention in a base fluid. In other embodiments, the concentrates including from about 1.5% w/v to about 2.5% w/v of a dry composition of this invention in a base fluid.

Embodiments of the present invention relate to slick water fracturing fluids including a diluted concentrate of this invention, where the diluted fluids include between about 0.1% v/v to about 10% v/v of the concentrate of this invention in the base fluid obtained by adding a sufficient amount of concentrate to the base fluid to achieve concentration of the dry composition in the base fluid. Embodiments of the present invention relate to slick water fracturing fluids including a diluted concentrate of this invention, where the diluted fluids include between about 0.5% v/v to about 5% v/v of the concentrate of this invention in the base fluid obtained by adding a sufficient amount of concentrate to the base fluid to achieve concentration of the dry composition in the base fluid. Embodiments of the present invention relate to slick water fracturing fluids including a diluted concentrate of this invention, where the diluted fluids include between about 1% v/v to about 3% v/v of the concentrate of this invention in the base fluid obtained by adding a sufficient amount of concentrate to the base fluid to achieve concentration of the dry composition in the base fluid. The diluted fluids generally have a viscosity between about 2 cP and about 100 cP. In other embodiments, the diluted fluids have a viscosity between about 3 cP and about 100 cP. In other embodiments, the diluted fluids have a viscosity between about 4 cP and about 100 cP. In other embodiments, the diluted fluids have a viscosity between about 5 cP and about 100 cP. In other embodiments, the diluted fluids have a viscosity between about 10 cP and about 100 cP. In other embodiments, the diluted fluids have a viscosity between about 15 cP and about 100 cP. In other embodiments, the diluted fluids have a viscosity between about 20 cP and about 100 cP. In other embodiments, the diluted fluids have a viscosity between about 25 cP and about 100 cP.

Currently, the majority of hydraulic fracturing treatments in the United States are being executed in Shale Plays. These treatments typically include multiple fracturing treatments (stages) executed along a horizontal wellbore. The number of stages varies between about 8 and about 18. Commonly, the operating procedures include pumping down a plug of a fluid and a perforating gun assembly after a stage is completed, except for the last stage. The perforating operation generally takes about 4 hours; provided there are no complications. During this pump down and perforating operation, a concentrated polymer solution is prepared using the mixing system of this invention; depending on job size, this will generally take between about 5 minutes to about 30 minutes. The polymer concentrate will then have sufficient time to reach complete or substantially complete hydration before being pumped downhole during the fracturing operation.

In certain embodiments, a 6" Lobestar Shear/Mixer having a 2.5" nozzle orifice is used to prepare concentrates of friction reducers based on partially hydrolyzed polyacrylamide (PHPA). The inventors found a good match between the friction reduction properties observed when using 1% w/v % concentrate of dry friction reducer (DRP-2340) in Large Scale (Example 1 concentrate made with re-circulation) and the obtained from concentrate made at Lab Scale.

High friction reduction properties were observed when a tested slick water system prepared with concentrate of dry composition (DRP-2340) sheared only once (Example 2 concentrate made in a single pass through the vortex chamber).

Poor Dispersion/Hydration of an guar gum was observed with fluids having a dry composition concentration of approximately 80 lb/1000 gal.

APPARATUS OF THE INVENTION

Embodiment 1A

Referring now to FIG. 1A, a schematic diagram of an embodiment of a mixing apparatus, generally 100, of this invention is shown to include a base fluid supply unit 110, a vortex mixing unit 130 and optionally a dilution unit 160. The base fluid supply unit 110 includes a base fluid supply reservoir 112 and a feed line 114 for supplying a base fluid to the vortex mixing unit 130.

The vortex mixing unit 130 includes a dry composition feed hopper 132, a radial mixing zone 134, a dry composition feed line 136, a base fluid supply line 138 and a base fluid inlet 140. The supply line 138 supplies a first portion of the base fluid from the feed line 114 into the vortex mixing radial mixing zone 134 to produce a turbulent cyclonic flow within the radial mixing zone 134. The dry composition is mixed with the first portion of the base fluid in the radial mixing zone 134 under cyclonic mixing conditions to form a pre-wetted and partially hydrated fluid, which may be a slurry, where the dry composition comprises one hydratable agent or a plurality of hydratable agents and optionally one gelling agent or a plurality of gelling agents.

The radial mixing zone 134 also includes a nozzle 142 disposed in the feed line 114, where a second portion of the base fluid is fed through the nozzle 142 to produce a vacuum mixing zone 144 in the line 114 just downstream of an exit 146 of the nozzle 142. The vacuum mixing zone 144 draws or sweeps the pre-wetted and partially hydrated fluid through an outlet 148, where the pre-wetted and partially hydrated fluid is mixed into the second portion of the base fluid to form a concentrate including partially, substantially completely or completely hydrated hydratable agents in the dry composition. The concentrate is then forwarded to the optional dilution unit 160 via the concentrate line 150. The radial mixing zone 134 and the vacuum mixing zone 144 form the heart of the vortex mixing unit 130 as these two zones together are responsible for vortex mixing resulting in wetting and then hydrating of the hydratable components in the dry composition.

The concentrate may be fed directly into a downhole pumping station and into a well (not shown) or the concentration may be diluted with a dilution fluid supplied from the dilution unit 160. The dilution unit 160 includes a dilution fluid reservoir 162 and a dilution fluid supply line 164. The dilution fluid mixes with the concentrate to form a diluted fluid which is then forwarded to the well via a fracturing fluid supply line 198.

The apparatus 100 includes valves, shut offs, sensors and other devices to control the mixing efficiency and effectiveness of the vortex mixing unit and to control the supply of the concentrate or diluted fluid to a well. Moreover, the apparatus 100 may include more than one vortex mixing unit if larger amounts of the fracturing fluid is required.

Embodiment 1B

Figure 1B:
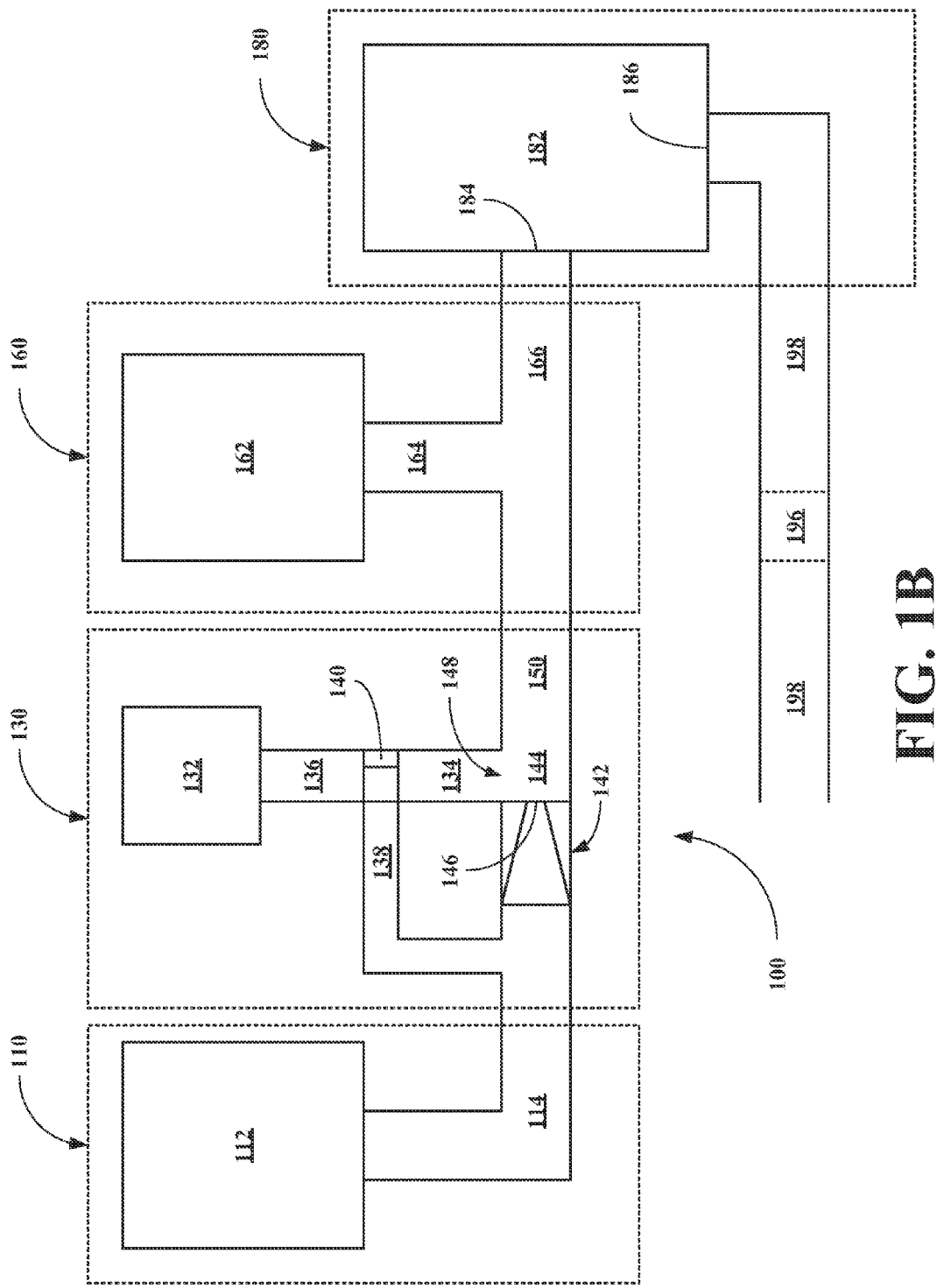
FIG. 1B depicts a schematic diagram of another embodiment of a mixing apparatus of this invention.

Referring now to FIG. 1B, a schematic diagram of another embodiment of a mixing apparatus of this invention is shown to include a schematic diagram of an embodiment of a mixing apparatus, generally 100, of this invention is shown to include a base fluid supply unit 110, a vortex mixing unit 130, a dilution unit 160 and an in-line holding unit 180. The base fluid supply unit 110 includes a base fluid supply reservoir 112 and a feed line 114 for supplying a base fluid to the vortex mixing unit 130.

The vortex mixing unit 130 includes a dry composition feed hopper 132, a radial mixing zone 134, a dry composition feed line 136, a base fluid supply line 138 and a base fluid inlet 140. The supply line 138 supplies a first portion of the base fluid from the feed line 114 into the vortex mixing radial mixing zone 134 to produce a turbulent cyclonic flow within the radial mixing zone 134. The dry composition is mixed with the first portion of the base fluid in the radial mixing zone 134 under cyclonic mixing conditions to form a pre-wetted and partially hydrated fluid, which may be a slurry, where the dry composition comprises one hydratable agent or a plurality of hydratable agents and optionally one gelling agent or a plurality of gelling agents.

The radial mixing zone 134 also includes a nozzle 142 disposed in the feed line 114, where a second portion of the base fluid is fed through the nozzle 142 to produce a vacuum mixing zone 144 in the line 114 just downstream of an exit 146 of the nozzle 142. The vacuum mixing zone 144 draws or sweeps the pre-wetted and partially hydrated fluid through an outlet 148, where the pre-wetted and partially hydrated fluid is mixed into the second portion of the base fluid to form a concentrate including partially, substantially completely or completely hydrated hydratable agents in the dry composition. The concentrate is then forwarded to the optional dilution unit 160 via the concentrate line 150. The radial mixing zone 134 and the vacuum mixing zone 144 form the heart of the vortex mixing unit 130 as these two zones together are responsible for vortex mixing resulting in wetting and then hydrating of the hydratable components in the dry composition.

The dilution unit 160 includes a dilution fluid reservoir 162 and a dilution fluid supply line 164, which supply an amount of a dilution fluid to the concentrate to dilute the concentrate to a concentration of the dry composition in the base fluid between about 0.001% w/v to about 5% w/v. The diluted fluid is then forwarded to the in-line holding unit 180 via a diluted fluid line 166.

The in-line holding unit 180 includes a holding tank 182 disposed in-line with an inlet 184 connected to the diluted fluid line 166 and an outlet 186 connected to a well supply line 198 for supplying the diluted fluid to a well (not shown). The supply line 198 may also include a static in-line mixer 196. The holding tank 162 may be static or stirred.

The apparatus 100 includes valves, shut offs, sensors and other devices to control the mixing efficiency and effectiveness of the vortex mixing unit and to control the supply of the concentrate or diluted fluid to a well. Moreover, the apparatus 100 may include more than one vortex mixing unit if larger amounts of the fracturing fluid is required.

Embodiment 1C

Figure 1C:
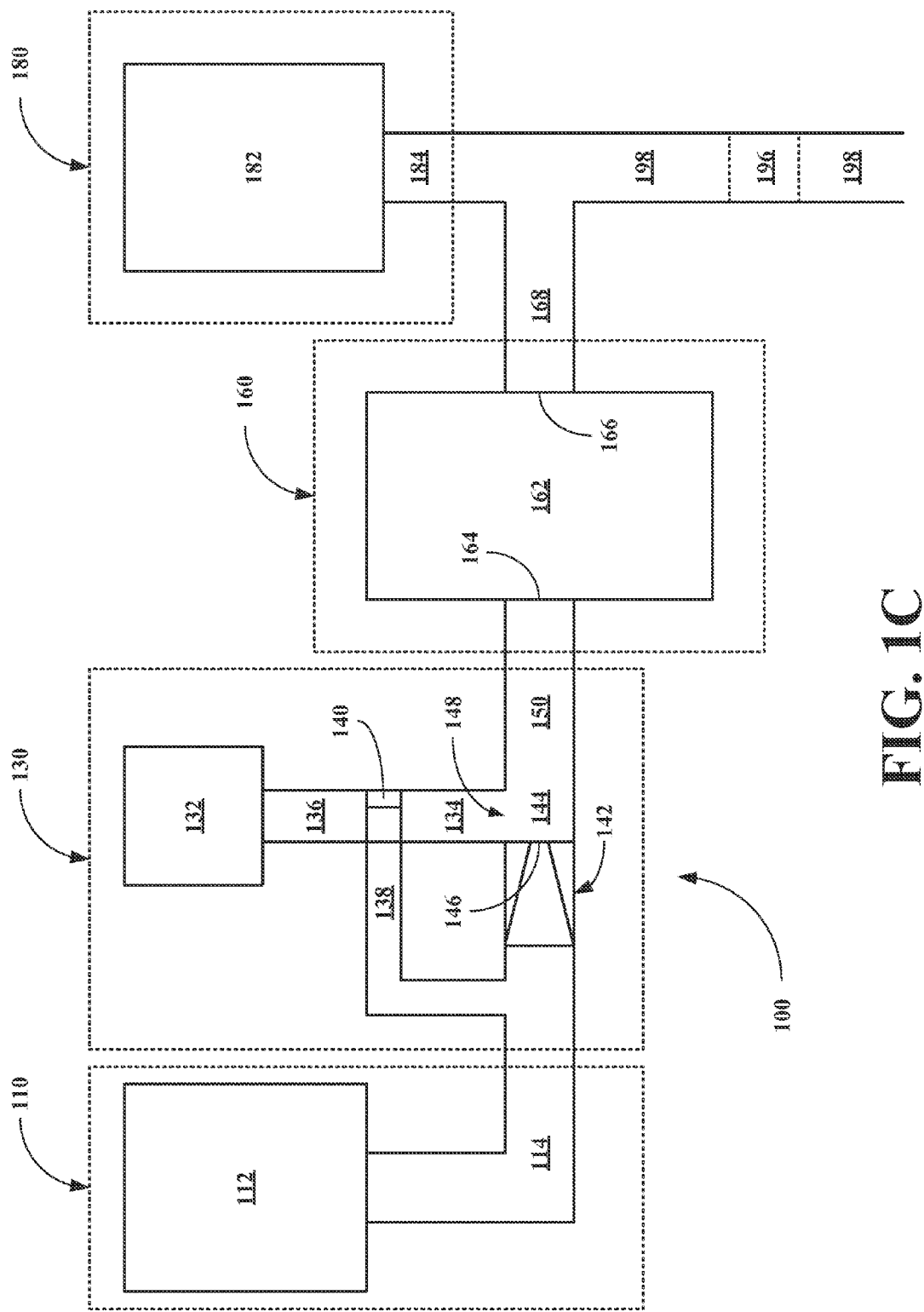
FIG. 1C depicts a schematic diagram of another embodiment of a mixing apparatus of this invention.

Referring now to FIG. 1C, a schematic diagram of another embodiment of a mixing apparatus of this invention is shown to include a schematic diagram of an embodiment of a mixing apparatus, generally 100, of this invention is shown to include a base fluid supply unit 110, a vortex mixing unit 130, an in-line holding unit 160 and a dilution unit 180. The base fluid supply unit 110 includes a base fluid supply reservoir 112 and a feed line 114 for supplying a base fluid to the vortex mixing unit 130.

The vortex mixing unit 130 includes a dry composition feed hopper 132, a radial mixing zone 134, a dry composition feed line 136, a base fluid supply line 138 and a base fluid inlet 140. The supply line 138 supplies a first portion of the base fluid from the feed line 112 into the vortex mixing chamber 134 to produce a turbulent cyclonic flow within the radial mixing zone 134. The dry composition is mixed with the first portion of the base fluid in the radial mixing zone 134 under cyclonic or vortex mixing conditions to form a pre-wetted and partially hydrated fluid, which may be a slurry, where the dry composition comprises one hydratable agent or a plurality of hydratable agents and optionally one gelling agent or a plurality of gelling agents.

The vortex mixing unit 134 also includes a nozzle 142 disposed in the feed line 114, where a second portion of the base fluid is fed through the nozzle 142 to produce a vacuum mixing zone 144 in the line 114 just downstream of an exit 146 of the nozzle 142. The vacuum mixing zone 144 draws or sweeps the pre-wetted and partially hydrated fluid through an outlet 148, where the pre-wetted and partially hydrated fluid is mixed into the second portion of the base fluid to form a concentrate including partially, substantially completely or completely hydrated hydratable agents in the dry composition. The concentrate is then forwarded to the in-line holding unit 160 via a first concentrate line 150. The radial mixing zone 134 and the vacuum mixing zone 144 form the heart of the vortex mixing unit 130 as these two zones together are responsible for vortex mixing resulting in wetting and then hydrating of the hydratable components in the dry composition.

The in-line holding unit 160 includes a holding tank 162 disposed in-line with an inlet 164 connected to the first concentrate line 150 and an outlet 166 connected to a second concentrate line 168 for supplying the concentrate to the dilution unit 180. The holding tank 162 may be static or stirred.

The dilution unit 180 includes a dilution fluid reservoir 182 and a dilution fluid supply line 184, which supply an amount of a dilution fluid to the concentrate to dilute the concentrate to a concentration of the dry composition in the base fluid between about 0.001% w/v to about 5% w/v. The dilution fluid is then forwarded to the well via a well supply line 198 for supplying the diluted fluid to a well (not shown). The supply line 198 may also include a static in-line mixer 196.

The apparatus 100 includes valves, shut offs, sensors and other devices to control the mixing efficiency and effectiveness of the vortex mixing unit and to control the supply of the concentrate or diluted fluid to a well. Moreover, the apparatus 100 may include more than one vortex mixing unit if larger amounts of the fracturing fluid is required.

Embodiment 2A

Figure 2A:
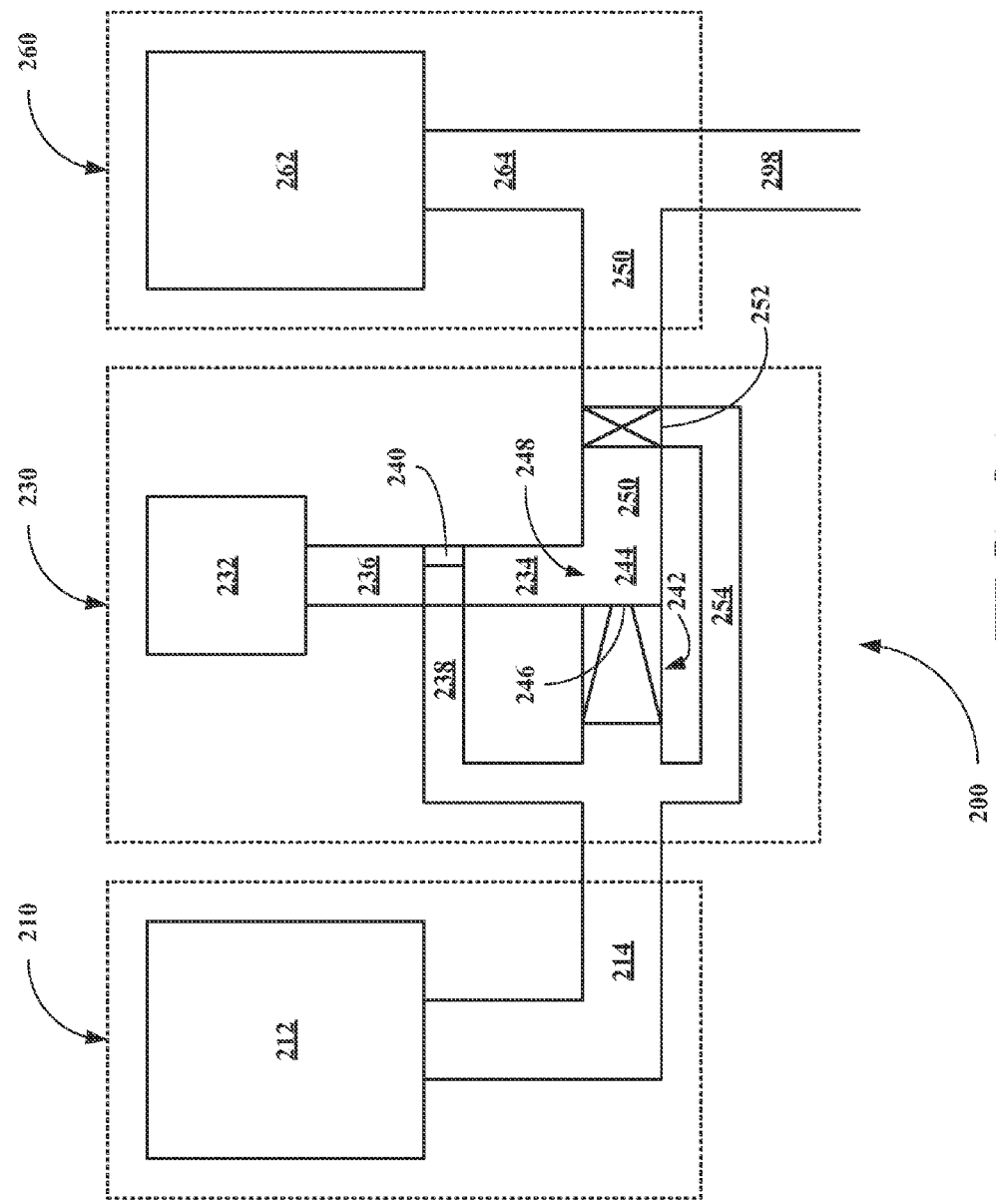
FIG. 2A depicts a schematic diagram of an embodiment of a mixing apparatus of this invention.

Referring now to FIG. 2A, a schematic diagram of another embodiment of a mixing apparatus, generally 200, of this invention is shown to include a base fluid supply unit 210, a vortex mixing unit 230 and optionally a dilution unit 260. The base fluid supply unit 210 includes a base fluid supply reservoir 212 and a feed line 214 for supplying a base fluid to the vortex mixing unit 230.

The vortex mixing unit 230 includes a dry composition feed hopper 232, a vortex mixing chamber 234, a dry composition feed line 236, a base fluid supply line 238 and a base fluid inlet 240. The supply line 238 supplies a first portion of the base fluid from the feed line 214 into the radial mixing zone 234 to produce a turbulent cyclonic flow within the radial mixing zone 234. The dry composition is mixed with the first portion of the base fluid in the radial mixing zone 234 under cyclonic or vortex mixing conditions to form a pre-wetted and partially hydrated fluid, which may be a slurry, where the dry composition comprises one hydratable agent or a plurality of hydratable agents and optionally one gelling agent or a plurality of gelling agents.

The vortex mixing unit 234 also includes a nozzle 242 disposed in the feed line 214, where a second portion of the base fluid is fed through the nozzle 242 to produce a vacuum mixing zone 244 in the line 214 just downstream of an exit 246 of the nozzle 242. The vacuum mixing zone 244 draws or sweeps the pre-wetted and partially hydrated fluid through an outlet 248 and the concentrate proceed down a concentrate line 250, where the pre-wetted and partially hydrated fluid is mixed into the second portion of the base fluid to form a concentrate including partially, substantially completely or completely hydrated hydratable agents in the dry composition. The radial mixing zone 234 also include a two way valve 252. The two way valve 252 allows all of a portion of the concentrate to be directed back to the feed line 214 via a recirculation line 254 so that all or a portion of the concentrate is fed back through the radial mixing zone 234. Once a desired recirculation is achieved designed to provide additional hydration time and/or to further reduce clumping, the valve 252 is set to forward all or a portion of the concentrate to down the concentrate line 252 to the dilution unit 260. The radial mixing zone 234 and the vacuum mixing zone 244 form the heart of the vortex mixing unit 230 as these two zones together are responsible for vortex mixing resulting in wetting and then hydrating of the hydratable components in the dry composition.

The concentrate may be fed directly into a downhole pumping station and into a well (not shown) or the concentration may be diluted with a dilution fluid supplied from the dilution unit 260. The dilution unit 260 includes a dilution fluid reservoir 262 and a dilution fluid supply line 264, which supply an amount of a dilution fluid to the concentrate to dilute the concentrate to a concentration of the dry composition in the base fluid between about 0.001% w/v to about 5% w/v. The dilution fluid mixes with the concentrate to form a diluted fluid which is then forwarded to the well via a fracturing fluid supply line 298.

The apparatus 200 includes valves, shut offs, sensors and other devices to control the mixing efficiency and effectiveness of the vortex mixing unit and to control the supply of the concentrate or diluted fluid to a well. Moreover, the apparatus 200 may include more than one vortex mixing unit if larger amounts of the fracturing fluid is required.

Embodiment 2B

Figure 2B:
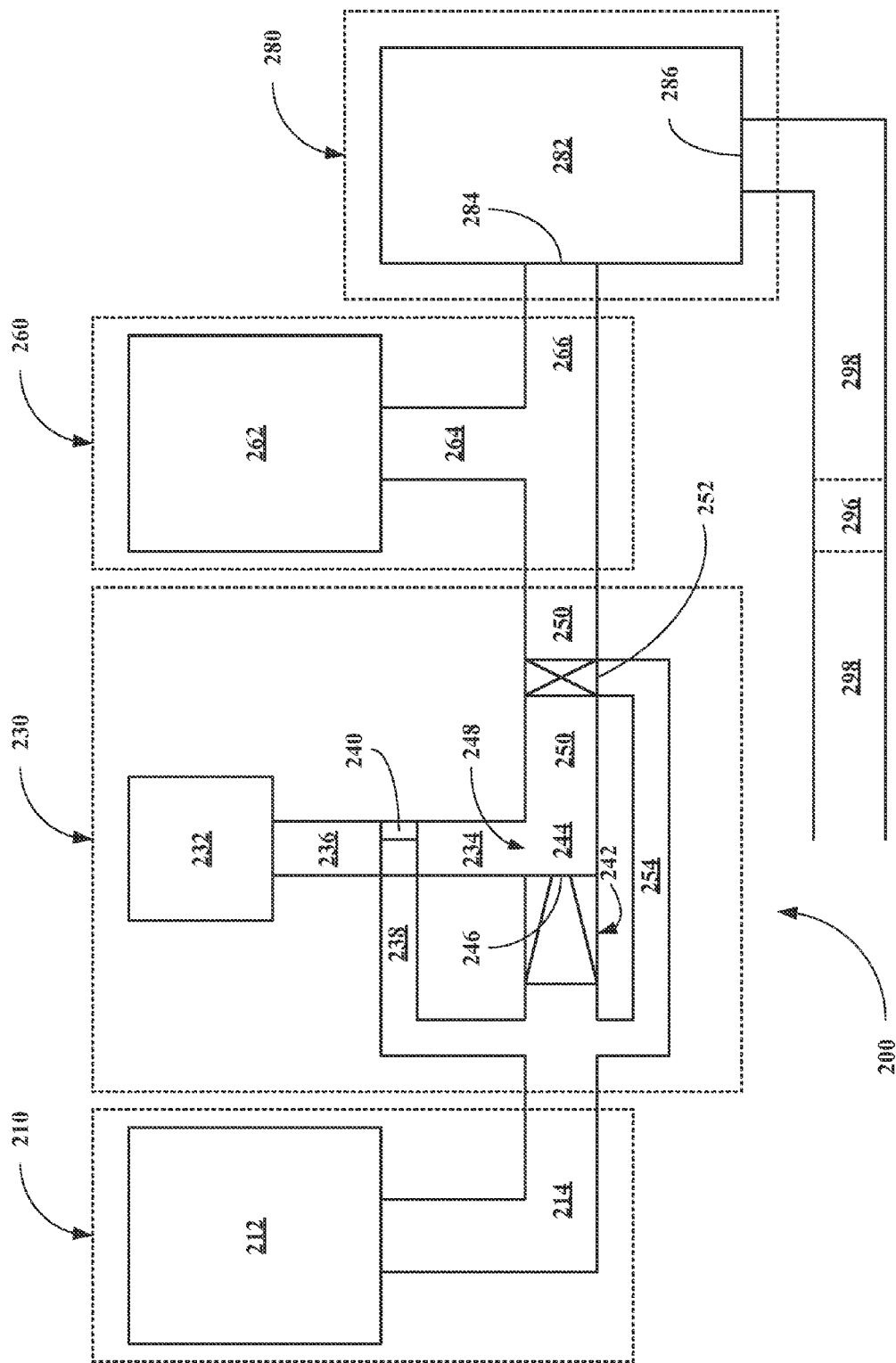
FIG. 2B depicts a schematic diagram of another embodiment of a mixing apparatus of this invention.

Referring now to FIG. 2B, a schematic diagram of another embodiment of a mixing apparatus of this invention is shown to include a schematic diagram of an embodiment of a mixing apparatus, generally 200, of this invention is shown to include a base fluid supply unit 210, a vortex mixing unit 230, a dilution unit 260 and an in-line holding unit 280. The base fluid supply unit 210 includes a base fluid supply reservoir 212 and a feed line 214 for supplying a base fluid to the vortex mixing unit 230.

The vortex mixing unit 230 includes a dry composition feed hopper 232, a radial mixing zone 234, a dry composition feed line 236, a base fluid supply line 238 and a base fluid inlet 240. The supply line 238 supplies a first portion of the base fluid from the feed line 212 into the radial mixing zone 234 to produce a turbulent cyclonic flow within the radial mixing zone 234. The dry composition is mixed with the first portion of the base fluid in the radial mixing zone 234 under cyclonic or vortex mixing conditions to form a pre-wetted and partially hydrated fluid, which may be a slurry, where the dry composition comprises one hydratable agent or a plurality of hydratable agents and optionally one gelling agent or a plurality of gelling agents.

The vortex mixing unit 234 also includes a nozzle 242 disposed in the feed line 214, where a second portion of the base fluid is fed through the nozzle 242 to produce a vacuum mixing zone 244 in the line 214 just downstream of an exit 246 of the nozzle 242. The vacuum mixing zone 244 draws or sweeps the pre-wetted and partially hydrated fluid through an outlet 248 and the concentrate proceed down a concentrate line 250, where the pre-wetted and partially hydrated fluid is mixed into the second portion of the base fluid to form a concentrate including partially, substantially completely or completely hydrated hydratable agents in the dry composition. The radial mixing zone 234 also include a two way valve 252. The two way valve 252 allows all of a portion of the concentrate to be directed back to the feed line 214 via a recirculation line 254 so that all or a portion of the concentrate is fed back through the radial mixing zone 234. Once a desired recirculation is achieved designed to provide additional hydration time and/or to further reduce clumping, the valve 252 is set to forward all or a portion of the concentrate to down the concentrate line 250 to the dilution unit 260. The radial mixing zone 234 and the vacuum mixing zone 244 form the heart of the vortex mixing unit 230 as these two zones together are responsible for vortex mixing resulting in wetting and then hydrating of the hydratable components in the dry composition.

The dilution unit 260 includes a dilution fluid reservoir 262 and a dilution fluid supply line 264, which supply an amount of a dilution fluid to the concentrate to dilute the concentrate to a concentration of the dry composition in the base fluid between about 0.001% w/v to about 5% w/v. The diluted fluid is then forwarded to the in-line holding unit 260 via a diluted fluid line 266.

The in-line holding unit 280 includes a holding tank 282 disposed in-line with an inlet 284 connected to the diluted fluid line 266 and an outlet 286 connected to a well supply line 298 for supplying the diluted fluid to a well (not shown). The supply line 298 may also include a static in-line mixer 296. The holding tank 282 may be static or stirred.

The apparatus 200 includes valves, shut offs, sensors and other devices to control the mixing efficiency and effectiveness of the vortex mixing unit and to control the supply of the concentrate or diluted fluid to a well. Moreover, the apparatus 200 may include more than one vortex mixing unit if larger amounts of the fracturing fluid is required.

Embodiment 2C

Figure 2C:
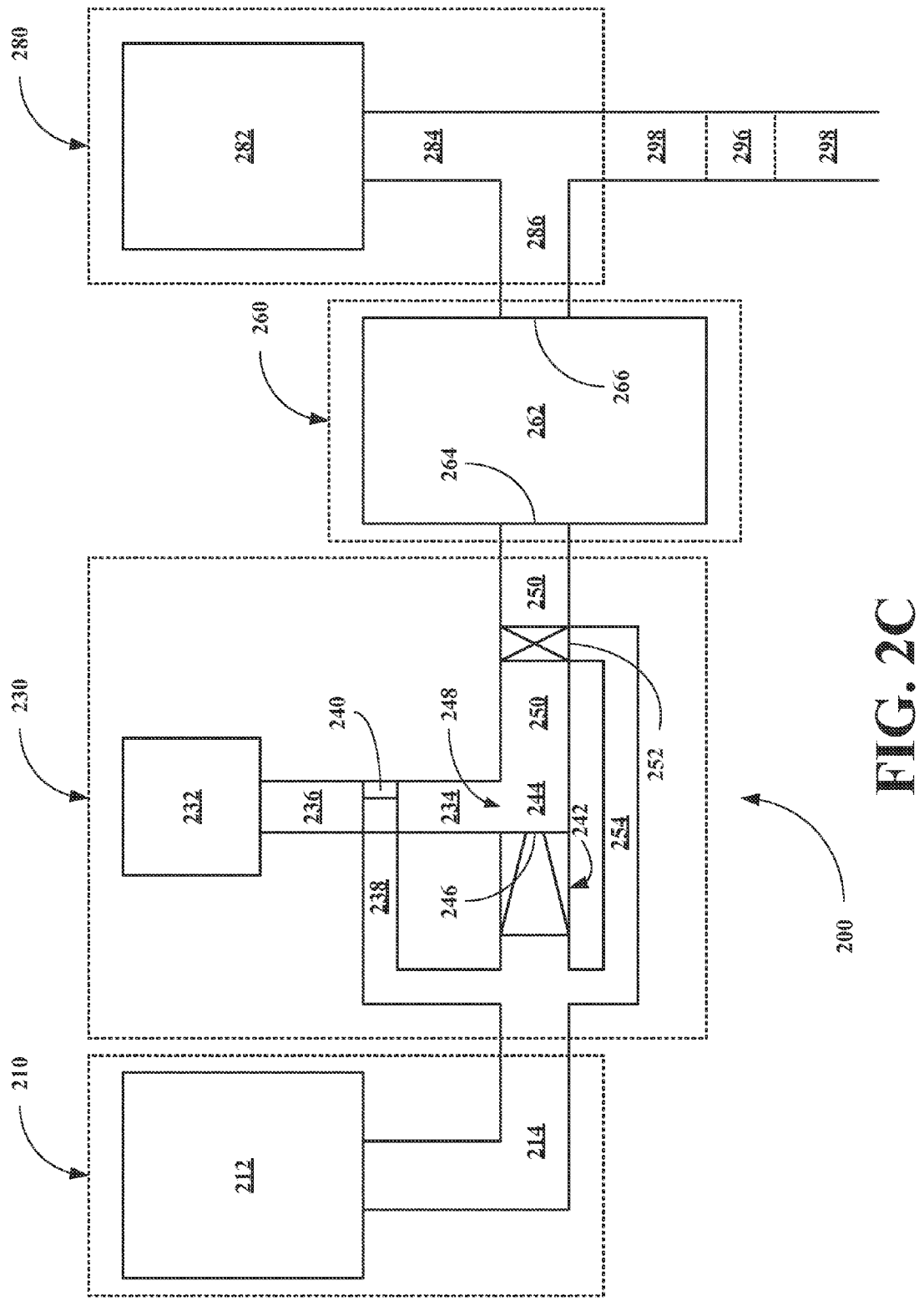
FIG. 2C depicts a schematic diagram of another embodiment of a mixing apparatus of this invention.

Referring now to FIG. 2C, a schematic diagram of another embodiment of a mixing apparatus of this invention is shown to include a schematic diagram of an embodiment of a mixing apparatus, generally 200, of this invention is shown to include a base fluid supply unit 210, a vortex mixing unit 230, a dilution unit 280 and an in-line holding unit 260. The base fluid supply unit 210 includes a base fluid supply reservoir 212 and a feed line 214 for supplying a base fluid to the vortex mixing unit 230.

The vortex mixing unit 230 includes a dry composition feed hopper 232, a radial mixing zone 234, a dry composition feed line 236, a base fluid supply line 238 and a base fluid inlet 240. The supply line 238 supplies a first portion of the base fluid from the feed line 212 into the radial mixing zone 234 to produce a turbulent cyclonic flow within the radial mixing zone 234. The dry composition is mixed with the first portion of the base fluid in the radial mixing zone 234 under cyclonic or vortex mixing conditions to form a pre-wetted and partially hydrated fluid, which may be a slurry, where the dry composition comprises one hydratable agent or a plurality of hydratable agents and optionally one gelling agent or a plurality of gelling agents.

The vortex mixing unit 234 also includes a nozzle 242 disposed in the feed line 214, where a second portion of the base fluid is fed through the nozzle 242 to produce a vacuum mixing zone 244 in the line 214 just downstream of an exit 246 of the nozzle 242. The vacuum mixing zone 244 draws or sweeps the pre-wetted and partially hydrated fluid through an outlet 248 and the concentrate proceed down a first concentrate line 250, where the pre-wetted and partially hydrated fluid is mixed into the second portion of the base fluid to form a concentrate including partially, substantially completely or completely hydrated hydratable agents in the dry composition. The radial mixing zone 234 also include a two way valve 252. The two way valve 252 allows all of a portion of the concentrate to be directed back to the feed line 214 via a recirculation line 254 so that all or a portion of the concentrate is fed back through the radial mixing zone 234. Once a desired recirculation is achieved designed to provide additional hydration time and/or to further reduce clumping, the valve 252 is set to forward all or a portion of the concentrate to down the first concentrate line 250 to the in-line holding unit 260. The radial mixing zone 234 and the vacuum mixing zone 244 form the heart of the vortex mixing unit 230 as these two zones together are responsible for vortex mixing resulting in wetting and then hydrating of the hydratable components in the dry composition.

The in-line holding unit 260 includes a holding tank 262 disposed in-line with an inlet 264 connected to the first concentrate line 250 and an outlet 266 connected to a second concentrate line 268 for supplying the concentrate to the dilution unit 280. The holding tank 262 may be statically stirred or mechanically stirred.

The dilution unit 280 includes a dilution fluid reservoir 282 and a dilution fluid supply line 284, which supply an amount of a dilution fluid to the concentrate to dilute the concentrate to a concentration of the dry composition in the base fluid between about 0.001% w/v to about 5% w/v. The dilution fluid is then forwarded to the well via a well supply line 298 for supplying the diluted fluid to a well (not shown). The supply line 298 may also include a static in-line mixer 296.

The apparatus 200 includes valves, shut offs, sensors and other devices to control the mixing efficiency and effectiveness of the vortex mixing unit and to control the supply of the concentrate or diluted fluid to a well. Moreover, the apparatus 200 may include more than one vortex mixing unit if larger amounts of the fracturing fluid is required.

EXPERIMENTS OF THE INVENTION

Effect of Pre-Shearing Time

The following examples were designed to determine the effects pre-shearing time at lab scale to make the concentrate and hydration time of the concentrate of different grades of partially hydrolyzed polyacrylamide (PHPA) from SNF and Kemira have on the final friction reduction properties of slick water systems.

The effect of the pre-shearing time to make the concentrate of friction reducer of this invention was determined in three different grades of high molecular weight of partially hydrolyzed polyacrylamide (PHPA) polymers from SNF (DPR-2340 and AN934SH) and from Kemira (Superfloc 120 HMW).

In this particular case, these examples were designed to test the effect of the pre-shearing time to make 1% w/v concentrate of polymer into the final friction reduction properties of slick water solutions of 0.027% w/v (equivalent on active material to the use of 1 gpt of WFR-55LA, available from Clearwater International, LLC of Elmendorf, Tex.).

Evaluation Protocol

Pre-shearing conditions to prepare the concentrate (1% w/v) included adding 5 g of a friction reducer composition of this invention into 500 g of water in a blending jar. Blend the mixture at 2500 RPM for specified time (15, 30, 45, 60 and 120 seconds).

Hydration Conditions

Add 250 cc of the 1% w/v concentrate to a graduated cylinder and leave in static conditions for 5 minutes.

Dispersion of Concentrate in Slick Water System

Add 250 cc of the hydrated concentrate (1.0% w/v) into 9 liters in a 5 gallons bucket and disperses it while agitating @ 140 RPM for 5 minutes. This will make an equivalent slick water system with 0.027% w/v active material.

Friction Reduction Properties of the Slick Water System

Add the 9.25 liter solution to the friction loop and set up the flow rate to 9 gal/min through a 5/16" tubing (Turbulent conditions with Re# of 121,000). Record ΔP every 30 seconds for 180 seconds.

Percent of friction reduction at time (t) was determined according to the following equation:

$$DR = 100 \times (\Delta P_{Water\ with\ no\ additive} - \Delta P_{slick\ Water\ System\ @\ time\ t}) / \Delta P_{Water\ with\ no\ additive}$$

Figure 3:
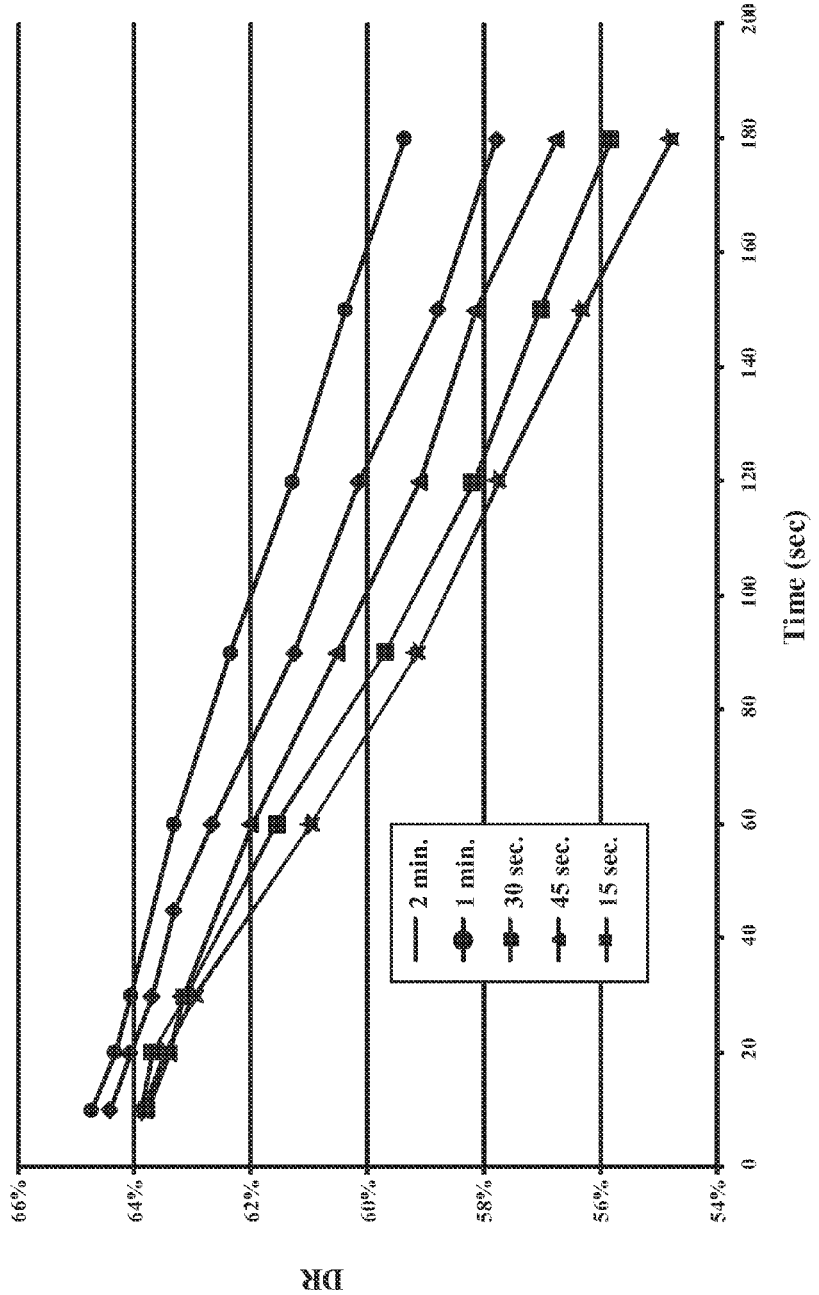
FIG. 3 depicts a plot of a friction tests of dry Superfloc A 120HMW concentration of 0.027% w/v from Kemira changing pre-shearing time @2500 rpm and post hydrating concentrate in slick water for 5 minutes.

Referring now to FIG. 3, it was found that the optimal pre-shearing time for the FR from Kemira Superfloc A-120HMW was 1 minute. Higher shearing time like 2 minutes may induce mechanical shear degradation that would be detrimental to the final friction reduction properties.

Figure 4:
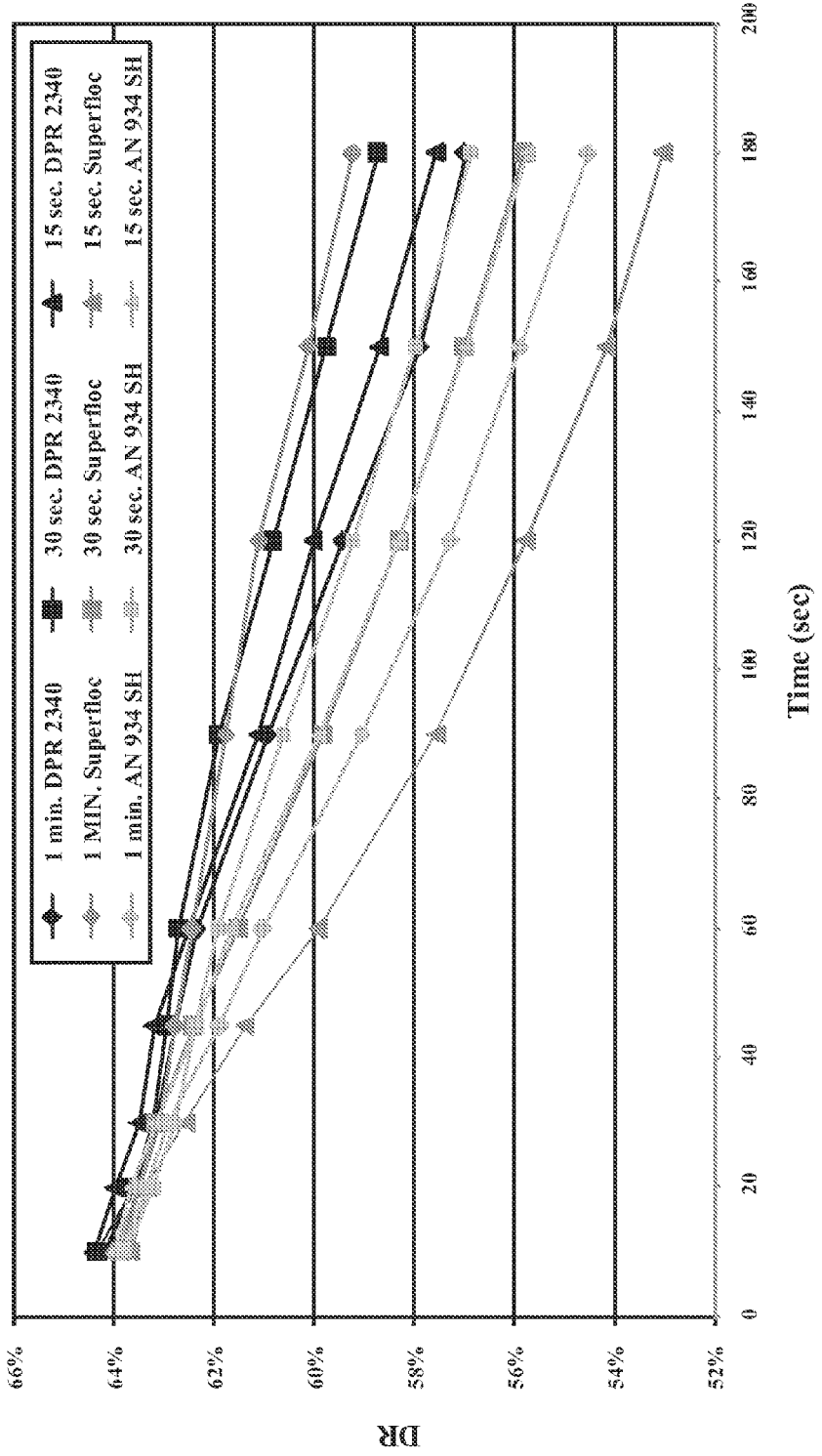
FIG. 4 depicts a plot of changing pre-shearing time in three polymer systems: shearing a for 1 minute, 30 seconds, and 15 seconds.

Referring now to FIG. 4, a plot shows the effect of pre-shearing of the three polymer systems up to 1 minute. It was observed similar friction reduction @ 180 seconds of evaluation when pre-shearing DPR-2340 for 30 seconds and pre-shearing Superfloc A-120HMW for 1 minute.

Effect of Hydration Time

Effects of the hydration time at lab scale were determined in three different grades of high molecular weight of partially hydrolyzed polyacrylamide such as DRP-2340 and AN934SH available from SNF, Inc. of Riceboro, Ga. and Superfloc 120 HMW available from Kemira Chemicals, Inc. available from Atlanta, Ga.

Evaluation Protocol

Friction reduction Properties of the slick water system:

Pre-Shearing

Add 5 g of friction reducer into 500 gr of water in a blending jar and blend it at 2500 rpm for 60 seconds.

Hydration

Add 250 cc of the 1% w/v concentrate to a graduated cylinder and leave in static conditions for 2, 5 or 10 minutes.

Dispersion

Add 250 cc of the hydrated concentrate (1.0% w/v) into 9 liters of water in a 5 gallons bucket and disperse, while agitating @ 140 RPM for 5 minutes. This will make an equivalent slick water system with 0.027% w/v slick water system.

Add the 9.25 liter of the slick water system to a friction loop and set a flow rate to 9 gal/min through 5/16" (Turbulent conditions with Re# of 121,000). Record ΔP every 30 seconds for 180 seconds.

Determine percentage of friction reduction at time t using the following equation:

$$DR = 100 \times (\Delta P_{Water\ with\ no\ additive} - \Delta P_{slick\ Water\ System\ @\ time\ t}) / \Delta P_{Water\ with\ no\ additive}$$

Figure 5:
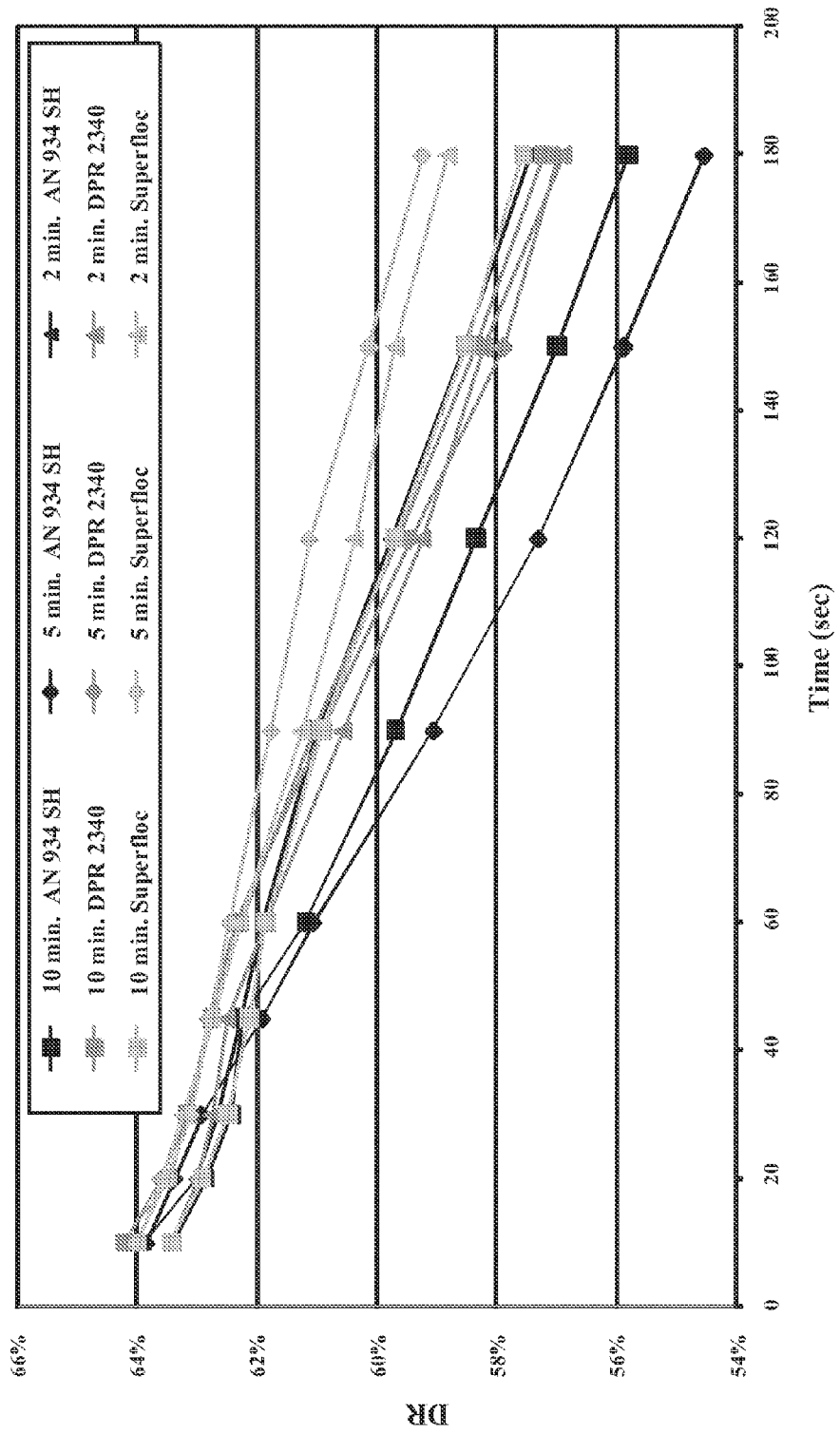
FIG. 5 depicts a plot of changing hydration procedure: shearing for 1 minute; hydrate for 2, 5, and 10 minutes and post-hydrate for 1 minute.

Referring now to FIG. 5, a plot shows the effect of the hydration time in the friction reduction properties. It can be clearly observed that for DPR-2340 it does not much influence the hydration time into the final friction reduction properties. The biggest effect on the influence on the hydration time was observed when evaluated AN 934 SH.

Figure 6:
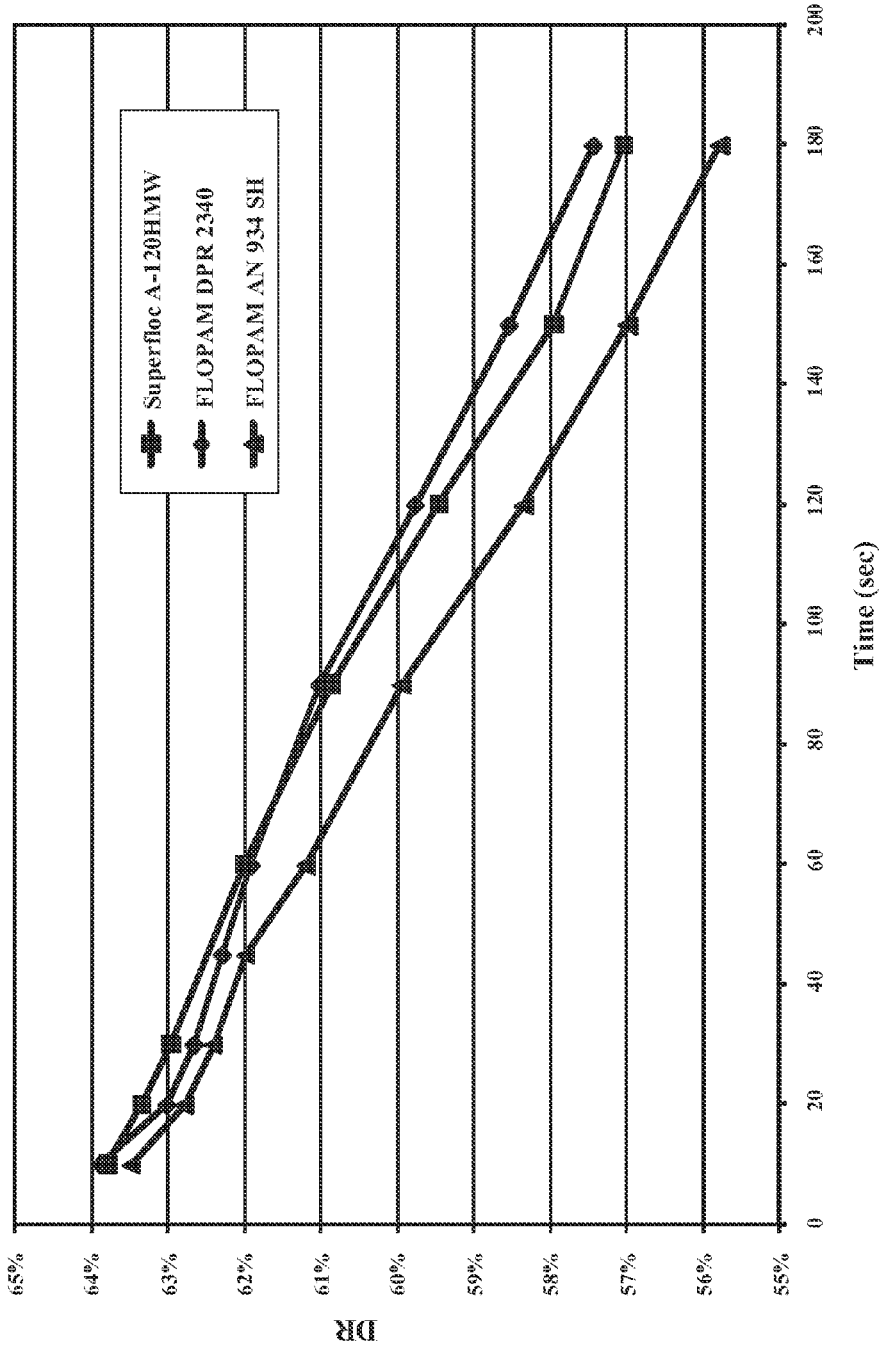
FIG. 6 depicts a plot of the effect of overnight hydration of slick water systems with no pre-shearing.

Referring now to FIG. 6, a plot shows the effect of hydration overnight (14 hr) with gentle mix (140 RPM) when just mixed the active material of FR (0.027% w/v) with not pre-shearing therefore without the use of a concentrate system. It can be observed that the three friction reducers yield to comparable friction reduction properties.

Comparison of Emulsion Version of FR (WFR-55LA) and Dry material version of FR (DPR-2340) The effect of the friction reduction properties when mixed dry form and invert emulsion is shown in the next chart. For the dry form (DPR-2340), it was prepared a concentrate of 1% w/v pre-shearing the dry material for 30 second @ 2500 RPM. The concentrate was hydrated for 5 minutes before adding it into the water system to be tested as slick water system at a concentration of 0.027% w/v. For the invert emulsion (FR-55LA) it was added the FR directly to the mixing tank of the flow loop on the fly and determined the friction reduction properties at different time.

Figure 7:
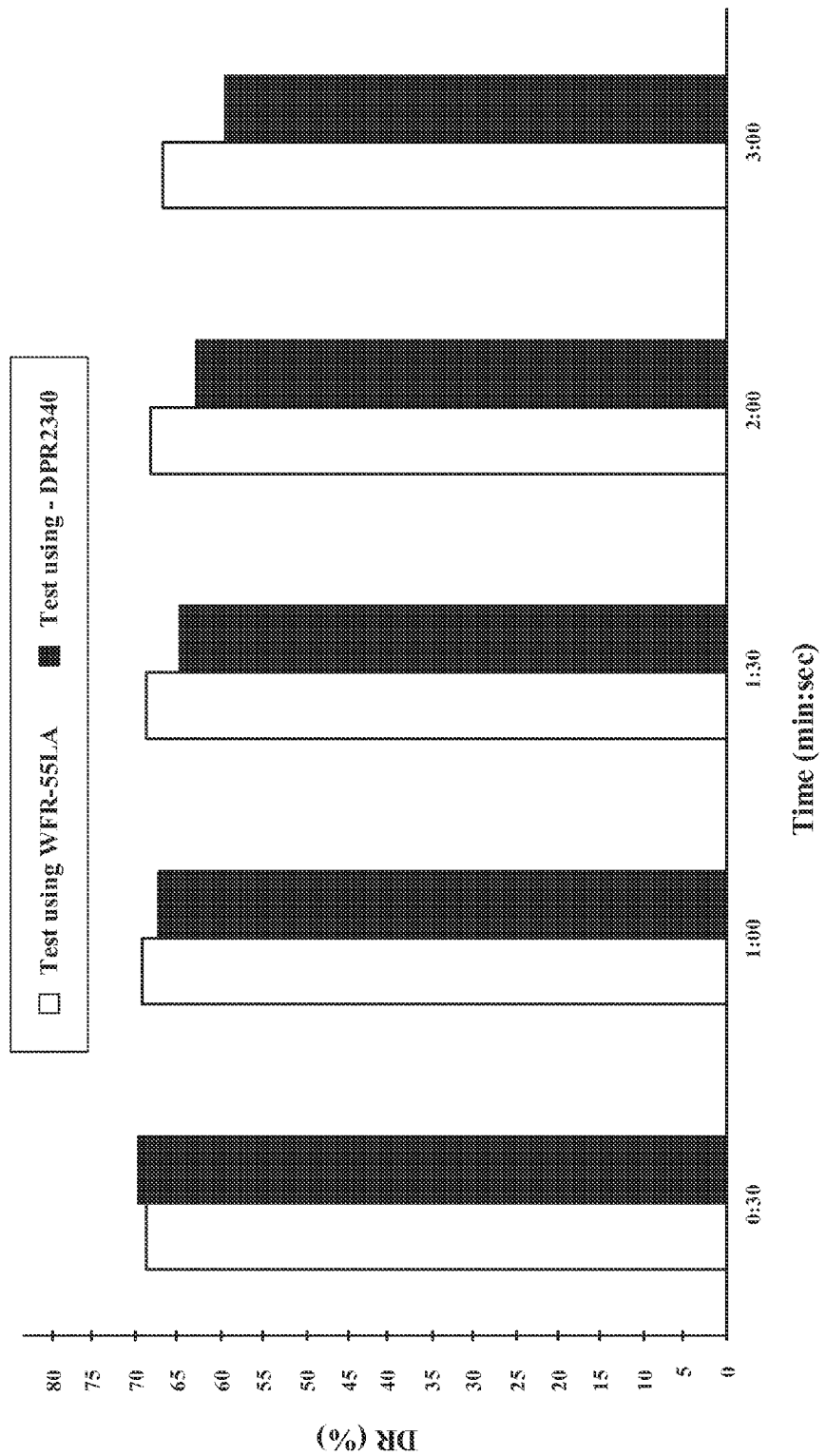
FIG. 7 depicts a bar graph comparing percent friction reduction in fresh water DPR-2340 vs. WFR-55LA at equivalent amounts of PHPA (0.027% w/v).

Referring now to FIG. 7, a plot shows the match of the slick water systems when prepared from WFR-55LA and DPR-2340 both using equal amount of active same active material (0.027% w/v).

Example 1

These examples illustrate mixing a dry composition including a partially hydrolyzed polyacrylamides (PHPA) and optionally a gelling agent into a base fluid to form a concentrated slurry or fluid concentrate using a vortex mixing apparatus of this invention.

Mixing Set Up

A 6" Lobestar Shear/Mixer available from Vortex Ventures Inc of Houston, Tex. having a 2.5" nozzle orifice and a six 6" supply valves for supply lines. The apparatus includes two 100 Bbl tanks, a centrifugal pump and a device for gravity feeding dry polymer to hopper of Lobestar Shear/Mixer. The Lobestar Shear Mixer includes a radial or vortex pre-mixer and a mixing eductor. The Lobestar Shear Mixer uses a nozzle in the main fluid flow pathway to produce a vacuum immediately downstream of the nozzle. The vacuum acts to sweep the partially hydrated slurry from the pre-mixer into the mixing eductor and the resulting fluid has a pressure of about 70% of the original fluid pressure. Prior to the nozzle, a portion of the base fluid is directed into the radial pre-mixer at an angle to produce a radial mixing of the dry composition into the base fluid. The dry composition is pre-wetted and partially hydrated in the pre-mixer, which has a transition section including an orifice opening to a vacuum zone produce by the nozzle in the main fluid flow path. The vacuum sweeps that partially hydrated fluid into the main fluid pathway to produce a concentrated, completely or substantially completely hydrated, clump free or substantially clump free fluid.

Example 1

Two Pass Friction Reducer Concentrate 110 lbs of DPR-2340, a friction reduction composition FR1, were mixed into received water to make a 1% w/v of a friction reduction composition within one minute. The initial concentration was recirculate through the mixer for an additional about 1 minute so that the concentrate underwent a two pass shear treatment using an apparatus of the type shown in FIGS. 2A-C. Mixing of the dry composition into the water was performed for 1 minute and the mixture was recirculated back through the mixing chamber for an additional minute. The initial flow rate was 26 bbl/min and the final flow rate was 12 bbl/minute. The number of passes needed to mix and shear the dry composition into the base fluid to form the concentrate was less than 2. A lab scale batch was also made. The two concentrates are referred to as C1A and C1B.

Example 2

One Pass Friction Reducer Concentrate 110 lbs of DPR-2340 were mixed with received water to make a 1% w/v a friction reduction composition of this invention within one minute. No further shearing after the first pass was performed. Mixing of the dry composition within the water was made within 1 minute to form a concentrated fluid having a concentration of approximately 1.17% w/v of DPR-2340 in water. A lab scale batch was also made. The two concentrates are referred to as C2A and C2B.

Friction Reduction Tests

The C1A and C1A concentrated slurries or concentrates were hydrated for 5 minutes in static conditions prior to testing. The C1A and C1A concentrated slurries or concentrates were tested directly to simulate mixing and dosing on the fly.

Post-hydration of the C1A and C1B concentrates were prepared by adding 250 g of 1% w/v of either C1A or C1B to 9 liters of fresh water. Post-hydration of the C2A and C2B concentrates were prepared by adding 213.6 gr of 1.17% w/v of either C2A or C2B to 9 liters of fresh water. These post-hydrated fluids were prepared to be slick water equivalents of slick water system including 1 gpt of WFR-55LA, available from Clearwater International, LLC of Elmendorf, Tex. The testing of the Friction Reduction was at Re#121,000 for 3 minutes.

Friction Reduction Result

The data show that friction reduction of the concentrates in large scale (C1A and C2A) vs. lab scale are comparable using equivalent active material as the 1 gpt WFR-55LA control.

As shown in FIG. 8, it was observed good match between the friction reduction properties when compared slick water systems made with concentrate made at lab scale and Large Scale Example 1. Friction reduction properties of system prepared with 1 gpt of WFR-55LA was slight higher especially at the last minute of evaluation. Friction reduction properties of Example 2 (Equivalent to make concentrate and tested on the Fly) was much lower.

Example 3

3 Minute Shearing Guar Gum Concentrate

Mixing Guar Gum WGA-15. Mixing Set Up. 6" Lobestar Shear/Mixer—with 2.5" nozzle orifice (See diagram below). Supply six 6" valves for supply lines. Two 100 Bbl tanks. Centrifugal pump.

Test 3 (3 Minute Shearing Guar Gum Concentrate)

It was set the test to mix 100 lb of WGA-15 in approximately 30 bbl to make an equivalent of 79.33 lb/1000 gal of guar gum concentrate in 1 minute or less. It was after re-circulated for 2 more minutes at a rate of 25 bbl/min.

Final Mixing

Mixed dry accordingly. It was observed poor Dispersion/Hydration of the guar gum system which was reflected in high deposition of material in the bottom of the receiving tank.

Hydration Results

TABLE I

Viscosity of Linear Gel systems made with WGA-15 @ 511 s$^{-1}$ (viscosity measured in R1:B1 geometries using Ofite 900 and Grace 3500 viscometers)

| Linear Gel System | Viscosity† (cP) | Viscosity‡ (cP) |
|---|---|---|
| 30 lb/1000 gal | 15.2-18.2 | 19.8 |
| 40 lb/1000 gal | 26.3-29.4 | 32.0 |
| 50 lb/1000 gal | 34.4-40.0 | 50.0 |

†viscosity of linear gel system from C3 just after mixing
‡viscosity of linear gel system made from WGA-15 at lab. scale after 5 hydration minutes (Pre-Sheared for 1 minute)

The data in column three of Table I show that careful control of the rate of dry solid addition into a vortex mixing chamber is important in producing a clump free and clear concentrate in a single pass through the vortex mixing chamber. The Guar Gum that was used in the large scale study tended to enter the vortex mixing chamber in large amount that did not have sufficient time to wet and adequately disperse. The clumping may be minimized by recirculating the concentrate through the vortex mixing, adding a device to control the rate of addition of the dry composition into the mixing chamber or by using a dispersible Guar Gum.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method of preparing fluids for treating a subterranean well comprising:
   feeding a dry composition into a top opening of a radial mixing zone of a vortex pre-mixer of a mixing apparatus, while concurrently radially directing a first portion of a base fluid into an angled inlet of the radial mixing zone to create a turbulent cyclonic flow of the base fluid and the dry composition in the radial mixing zone of the vortex pre-mixer, where a feed rate of the dry composition and a feed rate of the first portion of the base fluid are sufficient to pre-wet and partially hydrate the dry composition to form a pre-wetted and partially hydrated fluid, where the dry composition includes a hydratable agent or a mixture of hydratable agents and where the mixing apparatus is located on-site for on-demand hydration of the dry composition; and
   directing a second portion of the base fluid through a nozzle creating a vacuum and forming a mixing eductor or vacuum mixing zone of the mixing apparatus having a pressure of about 70% of a fluid pressure prior to exiting the nozzle, which pulls or sweeps the pre-wetted and partially hydrated fluid from the radial mixing zone into the second portion of the base fluid to form a partially, substantially or completely hydrated concentrate that is clump free, fish-eye free or clump free and fish-eye free, where the second portion of the base fluid is larger than the first portion of the base fluid and where the feeding and directing occurs in a minute or less.

2. The method as in claim 1, further comprising:
   forwarding all or a portion of the concentrate back through the mixing apparatus to further hydrate the hydratable agents in the concentrate, where the forwarding back through occurs for an additional hydration time to further reduce clumping.

3. The method as in claim 1, further comprising:
diluting the concentrate with an amount of water or an aqueous solution, where the amount is sufficient to produce slick water systems or fracturing fluids, where the dry composition for the fracturing fluids further includes a gelling agent or a mixture of gelling agents.

4. The method as in claim 1, further comprising:
forwarding the concentrate into a holding tank for storage until use.

5. The method as in claim 1, further comprising:
forwarding the concentrate into a holding tank for a time sufficient to completely or substantially completely hydrate the concentrate.

6. The method as in claim 1, further comprising:
forwarding all or a portion of the concentrate back through the mixing apparatus to further hydrate the hydratable agents in the concentrate, where the forwarding back through occurs for an additional hydration time to further reduce clumping; and
forwarding the concentrate into a holding tank for storage.

7. The method as in claim 1, further comprising:
forwarding all or a portion of the concentrate back through the vortex mixing apparatus to further hydrate the hydratable agents in the concentrate, where the forwarding back through occurs for an additional hydration time to further reduce clumping;
forwarding the concentrate into a holding tank for storage; and
diluting the concentrate with an amount of water or an aqueous solution, where the amount is sufficient to produce slick water systems, or viscous fluids, or gelled viscous fluids, where the dry composition further includes a gelling agent or a mixture of gelling agents.

8. The method as in claim 1, wherein the dry composition further includes a gelling agent or a mixture of gelling agents for the hydratable agents.

9. The method as in claim 8, further comprising:
forwarding the concentrate into a holding tank for a time sufficient to completely or substantially completely hydrate the concentrate, and
diluting the concentrate with an amount of water or an aqueous solution, where the amount is sufficient to produce slick water systems, or viscous fluids, or gelled viscous fluids, where the dry composition for the gelled viscous fluids further includes a gelling agent or a mixture of gelling agents.

10. A method for treating a subterranean formation comprising:
feeding a dry composition into a top opening of a radial mixing zone of a vortex mixing apparatus, while concurrently radially directing a first portion of a base fluid into an angled inlet of the radial mixing zone to create a turbulent cyclonic flow of the base fluid and the dry composition in the radial mixing zone, where a feed rate of the dry composition and a feed rate of the first portion of the base fluid are sufficient to pre-wet and partially hydrate the dry composition to form a pre-wetted and partially hydrated fluid, where the dry composition includes a hydratable agent or a mixture of hydratable agents and where the vortex mixing apparatus is located on-site for on-demand hydration of the dry composition;
directing a second portion of the base fluid through a nozzle creating a vacuum and forming a mixing eductor or vacuum mixing zone having a pressure of about 70% of a fluid pressure prior to exiting the nozzle, which pulls or sweeps the pre-wetted and partially hydrated fluid from the radial mixing zone into the second portion of the base fluid to form a partially, substantially or completely hydrated concentrate that is clump free, fish-eye free or clump free and fish-eye free, where the second portion of the base fluid is larger than the first portion of the base fluid and where the feeding and directing occurs in a minute or less; and
treating the formation with a slick water fluid including an effective amount of the concentrate so that the slick water fluid has a viscosity between about 2 cP and about 100 cP.

11. The method as in claim 10, wherein:
the slick water fluid comprises a fracturing fluid;
the dry composition further includes a gelling agent or a mixture of gelling agents; and
the treating comprises:
injecting the fracturing fluid into the subterranean formation under sufficient injection velocity and pressure to fracture the subterranean formation.

12. The method as in claim 10, further comprising:
forwarding all or a portion of the concentrate back through the vortex mixing apparatus to further hydrate the hydratable agents in the concentrate, where the forwarding back through occurs for an additional hydration time to further reduce clumping.

13. The method as in claim 10, further comprising:
diluting the concentrate with an amount of water or an aqueous solution to form a diluted composition.

14. The method as in claim 13, wherein the diluted composition comprises a slick water system, or a viscous fluid, or gelled viscous fluid.

15. The method as in claim 10, further comprising:
forwarding the concentrate into a holding tank for storage until use.

16. The method as in claim 10, further comprising:
forwarding the concentrate into a holding tank for a time sufficient to completely or substantially completely hydrate the concentrate.

17. The method as in claim 10, further comprising:
forwarding all or a portion of the concentrate back through the vortex mixing apparatus to further hydrate the hydratable agents in the concentrate, where the forwarding back through occurs for an additional hydration time to further reduce clumping; and
forwarding the concentrate into a holding tank for storage.

18. The method as in claim 10, further comprising:
forwarding the concentrate into a holding tank for a time sufficient to completely or substantially completely hydrate the concentrate, and
diluting the concentrate with an amount of water or an aqueous solution, where the amount is sufficient to produce a fracturing fluid having a viscosity between about 2 cP and about 100 cP.

19. The method as in claim 10, further comprising:
forwarding all or a portion of the concentrate back through the vortex mixing apparatus to further hydrate the hydratable agents in the concentrate;
forwarding the concentrate into a holding tank for storage; and
diluting the concentrate with an amount of water or an aqueous solution, where the amount is sufficient to produce a fracturing fluid having a viscosity between about 2 cP and about 100 cP.

20. The method as in claim 10, wherein the dry composition further includes a gelling agent or a mixture of gelling agents for the hydratable agents.

* * * * *